Patented Sept. 9, 1947

2,427,165

UNITED STATES PATENT OFFICE 2,427,165

MANUFACTURE OF RUTILE

Charles A. Tanner, Jr., Amherst, and Winfred J. Cauwenberg, Piney River, Va.

No Drawing. Application January 29, 1944, Serial No. 520,330

4 Claims. (Cl. 23—202)

This invention relates to the preparation of rutile titanium dioxide by the calcination of an anatase precipitate under controlled conditions, and aims to provide a special method of making a seed therefor.

Titanium dioxide, within the thirty years since its introduction as a pigment, has made such rapid strides that it has become the outstanding white pigments used in the coating and allied industries; this popularity is due mainly to its whiteness, stability, high hiding power, higher tinting strength, and ready dispersibility in vehicles. It is prepared largely by the hydrolysis, under carefully controlled conditions, of titanium sulfate solutions containing iron, prepared by digestion of ilmenite (a native ferrous titanate) with sulfuric acid, followed by reduction of all ferric iron to ferrous iron, removal of a part of the iron by crystallization as ferrous sulfate, clarification and adjustment of concentration; the hydrolysate is calcined, together with conditioning agents, to produce the desired white pigment.

The titanium dioxide so produced has been predominantly of anatase crystal structure, one of the three crystal modifications (anatase, brookite, rutile) in which titanium dioxide occurs. The art has known that the rutile structure, on account of its higher refractive index, should have higher hiding power and tinting strength than the anatase structure, but rutile titanium dioxide having better hiding power and tinting strength has not been available commercially because there has been no process for its production at a cost comparable with that of producing anatase.

It is well known that the uncalcined precipitate obtained by the hydrolysis of titanium sulfate has the crystal structure of anatase which is further developed upon calcination as the combined water and the combined and/or adsorbed acid are expelled. It is also known that the uncalcined precipitate obtained by the hydrolysis of titanium salts of monobasic acids such as, for example, titanium chloride, has the crystal structure of rutile which is further developed upon calcination. It is also known that the anatase structure obtained by the hydrolysis of titanium sulfate can be converted to rutile by continued calcination at a very high temperature. Such calcination, however, causes crystal growth and discoloration, which results in a product undesirable for use as a white pigment. No process in which the titanium is precipitated from salts of monobasic acids is economically competitive with the sulfate process largely because of higher acid cost and the corrosion problems introduced by the use of these monobasic acids.

In copending application Serial No. 422,104, filed December 8, 1941, it is proposed to convert an anatase precipitate, obtained by the hydrolysis of titanium sulfate solutions, to rutile, by first roasting the precipitate in the presence of an alkali metal salt, washing the roasted precipitate substantially free of alkali metal salt, and then calcining in the presence of a small amount of a rutile seed consisting of calcined titanium dioxide, having the crystal structure of rutile, or consisting of an uncalcined precipitate obtained by the hydrolysis of an aqueous solution of a monobasic acid compound of titanium. It is disclosed that the rutile seed may be added either prior to or after the roasting operation.

In copending patent application Serial No. 422,082, filed December 8, 1941, it is proposed to convert an anatase precipitate, obtained by the hydrolysis of titanium sulfate solutions, to rutile by calcining in the presence of a small amount of alkali metal compound and a small amount of a rutile seed consisting of calcined titanium dioxide having the crystal structure of rutile or consisting of an uncalcined precipitate obtained by hydrolysis of an aqueous solution of a monobasic acid compound of titanium.

In copending Ross and Tanner application Serial No. 429,118, filed January 31, 1942, it is proposed to prepare a rutile seed for use in the production of titanium dioxide of rutile crystal structure by treating an alkali metal titanate with limited quantities of a monobasic acid, such as hydrochloric acid. The titanate is treated with hydrochloric acid in sufficient quantity to combine with the sodium oxide and in sufficient excess for about 20% to about 50% of theory for the formation of titanium tetrachloride. About 25% of the theoretical quantity for titanium tetrachloride after neutralizing the sodium oxide is preferred. The hydrochloric acid slurry is diluted with water and boiled for about one hour. Nitric acid or other monobasic acids may be used in place of hydrochloric acid. The amount of acid used is insufficient for complete solution of titanium. The titanium, however, during the boiling period, is transformed to a desirable rutile seed for use in converting anatase struction to rutile structure during calcination. Some such seeds show complete rutile structure under X-ray analysis.

We have discovered that a much more active seed can be prepared from alkali metal titanate, if the titanate is first acid-treated to convert the alkali metal to a salt, the salt washed out of the titanium complex, and the complex finally heated with monobasic acid to produce the seed. Because of the increased activity of the seed, pigment of much improved color is obtained.

Preferably, the pH of the titanate is adjusted to between about 2.6 and 3.0 with acid, preferably monobasic acid; it is filtered and washed to where it shows only a faint test for the anion of the acid used. The washed product is then converted to a seed by adding monobasic acid to the amount of 20 to 50% of theory for the formation of the normal salt, diluting with water, and boiling, as disclosed in application Serial No. 429,118.

In the indicated pH range, the titanium complex formed remains flocculated, and washes well, without loss of titanium in the filtrate. If the pH is too high, deflocculation occurs, so that filtration and washing is more difficult, and considerable alkali metal is retained in the seed. If the pH is too low, considerable titanium is dissolved.

Example 1

As typical of our invention, we started with a water-washed sodium titanate slurry having the following composition, on a dry basis:

| | |
|---|---|
| $TiO_2$ _____per cent__ | 84.4 |
| $Na_2O$ _____do____ | 15.5 |
| $Fe_2O_3$ _____do____ | .052 |
| $P_2O_5$ _____do____ | .01 |
| $SO_4$ _____P. P. M.__ | 30 |

This water-washed sodium titanate slurry was neutralized with HCl to a pH of 2.9, after which was added 0.2% $TiO_2$ as $TiCl_3$ to reduce all the iron present to the ferrous state. Calculations are based on the $TiO_2$ content.

The slurry was then heated to 50° C., and filtered immediately. The product was washed until the filtrate showed only a faint test for chloride ion.

This product, when dried, had the following analysis:

| | Per cent |
|---|---|
| $TiO_2$ | 99.0 |
| NaCl | .02 |
| $Fe_2O_3$ | .002 |

100 grams of this product was taken up with 125 cc. of commercial 20° Bé. HCl, diluted to 1.62 liters with water, and boiled at constant volume for one hour.

Analysis of the seed slurry showed:

| | |
|---|---|
| $TiO_2$ _____per cent__ | 6.0 |
| HCl _____do____ | 2.7 |
| Basicity _____do____ | 75.3 |
| Reduced $TiO_2$ _____g./l__ | .56 |
| $Fe_2O_3$ _____ .002% on $TiO_2$ basis | |

Example 2

The procedure was repeated as in Example 1, adjusting the pH to 3.1 with HCl. The slurry was heated to 50° C., and filtered immediately. During the washing the product became partially deflocculated due to the removal of NaCl and HCl with subsequent rise of pH above the flocculation value.

Analysis showed 95.0% $TiO_2$ on the washed and dried product. The rutile seed prepared from the product was somewhat less colloidal and not as well deflocculated as that in Example 1, probably due to the strong adsorption of the sodium salt during precipitation.

Example 3

The procedure was repeated as in Example 1, adjusting to a pH of 2.3 with HCl.

After washing the product was well flocculated but the filtrate showed an appreciable amount of soluble titanium due to solubility at this low pH.

However, the rutile seed showed the same characteristics as that in Example 1.

Example 4

The procedure was repeated as in Example 1, substituting $HNO_3$ for HCl, and omitting the $TiCl_3$ because of the oxidizing conditions.

After washing and drying the product analyzed as follows:

| | Per cent |
|---|---|
| $TiO_2$ | 99.0 |
| $Fe_2O_3$ | .05 |

The insoluble iron present in the seed was taken into consideration in the treatment of the anatase and seed slurry just prior to calcination. In other respects, the seed was equal to that in Example 1.

Analysis of seed:

| | Per cent |
|---|---|
| $TiO_2$ | 8.1 |
| HCl | 3.81 |
| Basicity | 74.3 |
| $Fe_2O_3$ | 0.05 |

Example 5

The procedure was repeated as in Example 1, substituting $H_2SO_4$ for HCl and $Ti_2(SO_4)_3$ for $TiCl_3$ in the neutralization of the sodium titanate slurry. The pH was adjusted to 3.1. The product was washed until it contained less than 100 P. P. M. $SO_4$, calculated on the $TiO_2$ content. It was then taken up with HCl, and boiled at constant volume, as in Example 1.

The seed made from this product had the same characteristics as that in Example 1. The small amount of sulfates present was not enough to noticeably interfere with the preparation of the rutile seed.

The titanous salt used in some of the above examples may not only be introduced as such, but may be introduced into the seed by preparation in situ, as by treatment with nascent hydrogen or by electrolysis, as described in our copending application Serial No. 466,338.

These seeds as compared with seed prepared from alkali metal titanate without removal of alkali metal, show very marked advantages.

Thus, the seed of Example 1 was added to an ordinary sulfate hydrolysate, which normally calcines to anatase, in comparison with a seed prepared from sodium titanate without removal of the sodium. Using 5% seed, 0.35% $K_2CO_3$ and 0.165% $Fe_2O_3$, based on the $TiO_2$ content of the hydrolysate, and calcining for 4 to 5 hours at 975° C., it was observed that the tinting strength and particularly the color, using the new seed, were considerably improved. Furthermore, this improvement can be obtained with as low as 1% of our seed, with the color remaining as good or better than with the unwashed seed.

An even more important advantage of the new seed lies in the fact that by adding more potash substantially improved color can be obtained. Color improves with addition of $K_2CO_3$, up to a limit, and then drops off sharply. With unwashed seed, at optimum seed concentration, color improves up to about 0.35% $K_2CO_3$, and drops off sharply thereafter. With the new seed, the color improves up to about 0.50% before dropping off; this color is far superior to that obtainable with heretofore known rutile processes. Of course, other potassium compounds may be used to replace the carbonate.

We believe that the activity of the seed is governed by the amount of alkali metal present during its formation. Thus, the seed of Example 2 is not as active as the seed of Example 1. Furthermore, if the titanate is neutralized and washed, as in Example 1, and the sodium ion thus removed is reintroduced as NaCl, before boiling with acid to prepare the seed, the same results are obtained as when the sodium ion is not removed by washing.

Typical examples of the production of pigment with our seeds are the following:

Example 6

A thoroughly washed aqueous pulp of an hydrated titanium dioxide precipitate, obtained by hydrolytic precipitation from a titanium sulfate solution, and containing 200 grams of titanium dioxide, is diluted with water to a calcined solids content of 20%, and mixed with 85 grams of the hydrochloric acid suspension of Example 1, which contains 5 grams of titanium dioxide. The mixture is filtered and washed until the filter cake is substantially free of chlorides. The filter cake is then mixed with a concentrated aqueous solution containing 0.24 gram of ferric ammonium sulfate, which contains .04 gram of ferric oxide, and with a concentrated aqueous solution containing 1.0 gram of potassium carbonate, dried and calcined by slowly raising the temperature from about 300° C. to about 975° C. during about five hours, and then holding at a temperature of about 975° C. to about 1000° C. for about four hours.

The pigment shows much improved color over the best pigment obtained with seed prepared in the presence of sodium ions.

Example 7

A thoroughly washed aqueous pulp of an hydrated titanium dioxide precipitate, obtained by hydrolytic precipitation from a titanium sulfate solution, and containing 200 grams of titanium dioxide, is diluted with water to a calcined solids content of 20%, and mixed with 34 grams of the hydrochloric acid suspension of Example 3, which contains 2 grams of titanium dioxide. The mixture is filtered and washed until the filter cake is substantially free of chlorides. The filter cake is then mixed with a concentrated aqueous solution containing 0.24 gram of ferric ammonium sulfate, which contains .04 gram of ferric oxide, and with a concentrated aqueous solution containing 0.7 gram of potassium carbonate, dried and calcined by slowly raising the temperature from about 300° C. to about 975° C. during about five hours, and then holding at a temperature of about 975° C. to about 1000° C. for about four hours.

The color of the finished pigment obtained by hydroclassification and dry milling is excellent.

Example 8

A thoroughly washed aqueous pulp of an hydrated titanium dioxide precipitate, obtained by hydrolytic precipitation from a titanium sulfate solution, and containing 200 grams of titanium dioxide, is diluted with water to a calcined solids content of 20%, and mixed with 13 grams of the hydrochloric acid suspension of Example 4, which contains 2 grams of titanium dioxide. The mixture is filtered and washed until the filter cake is substantially free of chlorides. The filter cake is then mixed with a concentrated aqueous solution containing 0.24 gram of ferric ammonium sulfate, which contains .04 gram of ferric oxide, and with a concentrated aqueous solution containing 1.0 gram of potassium carbonate, dried and calcined by slowly raising the temperature from about 300° C. to about 975° C. during about five hours, and then holding at a temperature of about 975° C. to about 1000° C. for about four hours.

Although only 1% of seed is used in this example, the pigment is comparable with that obtained in Example 6.

Example 9

A thoroughly washed aqueous pulp of an hydrated titanium dioxide precipitate, obtained by hydrolytic precipitation from a titanium sulfate solution, and containing 200 grams of titanium dioxide, is diluted with water to a calcined solids content of 20%, and mixed with 85 grams of the hydrochloric acid suspension of Example 5, which contains 5 grams of titanium dioxide. The mixture is filtered and washed until the filter cake is substantially free of chlorides. The filter cake is then mixed with a concentrated aqueous solution containing 0.24 gram of ferric ammonium sulfate, which contains .04 gram of ferric oxide, and with a concentrated aqueous solution containing 0.7 gram of potassium carbonate, dried and calcined by slowly raising the temperature from about 300° C. to about 975° C. during about five hours, and then holding at a temperature of about 975° C. to about 1000° C. for about four hours.

Example 10

A thoroughly washed aqueous pulp of an hydrated titanium dioxide precipitate, obtained by hydrolytic precipitation from a titanium sulfate solution, and containing 200 grams of titanium dioxide, is diluted with water to a calcined solids content of 20%, and mixed with 85 grams of the hydrochloric acid suspension of Example 5, which contains 5 grams of titanium dioxide. The mixture is filtered and washed until the filter cake is substantially free of chlorides. The filter cake is then mixed with a concentrated aqueous solution of aluminum sulfate containing 0.037 grams of aluminum oxide (which acts like iron oxide as a color stabilizer) and with a concentrated aqueous solution containing 0.7 gram of potassium carbonate, dried and calcined by slowly raising the temperature from about 300° C. to about 975° C. during about five hours, and then holding at a temperature of about 975° C. to about 1000° C. for about four hours.

While a rather definite calcination schedule is indicated in the examples, this schedule may be varied considerably, provided the ordinary range of calcination temperatures (ca. 850–1000° C.) is adhered to. In actual commercial operation the calcination may be continuous through a rotating horizontal kiln which is heated at the discharge end and in which therefore there is a gradual temperature change from one end of the kiln to the other.

Our calcined pigment, obtained in accordance with any of the modifications of the invention, may be either simply dry milled or wet milled, hydroclassified, treated with the usual reagents, filtered, dried and disintegrated in accordance with the present known procedures for producing the commercial titanium dioxide pigments having the anatase crystal structure.

Our finished pigment has many desirable properties, such as good resistance to chalking, excellent resistance to discoloration in white baking enamels, etc., but is characterized in the main by its exceptional hiding power and tinting strength. The hiding power and tinting strength of the product in which the conversion to rutile has been substantially complete is in the neighborhood of 40% higher than that of present commercial titanium dioxide having the anatase crystal structure. When the conversion to rutile has been less, the advantage in hiding power and tinting strength is correspondingly less.

We claim:

1. A process for the preparation of rutile titanium dioxide of improved color from hydrolysates which normally calcine to anatase which comprises filtering and washing such hydrolysates, adding to the filter cake a seeding agent for converting anatase to rutile, and thereafter filtering, washing, and calcining the filter cake at a temperature not exceeding about 1000° C., said seeding agent being prepared by reacting an alkali metal titanate with an acid in sufficient amount to completely convert the alkali metal content thereof to the salt of the acid, removing the alkali metal salt by washing, adding a monobasic acid to the resulting alkali metal-free titanium compound in amounts such as to theoretically convert 20% to 50% of the titanium compound to the normal titanium salt of said monobasic acid, and heating the resulting mixture.

2. A process for the preparation of rutile titanium dioxide of improved color from hydrolysates which normally calcine to anatase which comprises filtering and washing such hydrolysates, adding to the filter cake a seeding agent for converting anatase to rutile, and thereafter filtering, washing, and calcining the filter cake at a temperature not exceeding about 1000° C., said seeding agent being prepared by reacting an alkali metal titanate with an acid in sufficient amount to completely convert the alkali metal content thereof to the salt of the acid, introducing trivalent Ti ions into the mixture as a member of the group consisting of a separately prepared titanous salt and trivalent Ti ions produced in situ by further treatment, removing the alkali metal salt by washing, adding a monobasic acid to the resulting alkali metal-free composition in amounts such as to theoretically convert from 20% to 50% of the titanium compound to the normal titanium salt of the monobasic acid, and heating the resulting mixture.

3. A process for the preparation of rutile titanium dioxide of improved color from hydrolysates which normally calcine to anatase which comprises filtering and washing such hydrolysates, adding to the filter cake a seeding agent for converting anatase to rutile, filtering and washing, adding to the washed material a potassium compound in an amount up to about 0.5% calculated as potassium carbonate, and thereafter calcining the filter cake containing the seeding agent at a temperature not exceeding about 1000° C., said seeding agent being prepared by reacting an alkali metal titanate with an acid in sufficient amount to completely convert the alkali metal content thereof to the salt of the acid, removing the alkali metal salt by washing, adding a monobasic acid to the resulting alkali metal-free titanium compound in amounts such as to theoretically convert 20% to 50% of the titanium compound to the normal titanium salt of said monobasic acid, and heating the resulting mixture.

4. A process for the preparation of rutile titanium dioxide of improved color from hydrolysates which normally calcine to anatase which comprises filtering and washing such hydrolysates, adding to the filter cake a seeding agent for converting anatase to rutile, filtering and washing, adding to the washed material a potassium compound in an amount up to about 0.5% calculated as potassium carbonate, and thereafter calcining the filter cake containing the seeding agent at a temperature not exceeding about 1000° C., said seeding agent being prepared by reacting an alkali metal titanate with an acid in sufficient amount to completely convert the alkali metal content thereof to the salt of the acid, introducing trivalent Ti ions into the mixture as a member of the group consisting of a separately prepared titanous salt and trivalent Ti ions produced in situ by further treatment, removing the alkali metal salt by washing, adding a monobasic acid to the resulting alkali metal-free composition in amounts such as to theoretically convert from 20% to 50% of the titanium compound to the normal titanium salt of the monobasic acid, and heating the resulting mixture.

CHARLES A. TANNER, Jr.
WINFRED J. CAUWENBERG.

REFERENCES CITED

The following references are of record in the file of this patent:

UNITED STATES PATENTS

| Number | Name | Date |
|---|---|---|
| 2,078,279 | Richter | Apr. 27, 1937 |
| 2,292,507 | Brooks | Aug. 11, 1942 |
| 2,301,412 | Keats et al. | Nov. 10, 1942 |
| 2,286,882 | Bichowsky et al. | June 16, 1942 |
| 2,089,180 | Bousquet | Aug. 10, 1937 |

FOREIGN PATENTS

| Number | Country | Date |
|---|---|---|
| 149,316 | Great Britain | June 16, 1921 |
| 463,966 | Great Britain | Apr. 8, 1937 |
| 533,227 | Great Britain | Feb. 10, 1941 |